(12) United States Patent
Underwood

(10) Patent No.: US 8,300,643 B2
(45) Date of Patent: Oct. 30, 2012

(54) METHOD AND SYSTEM FOR PROVIDING USER CONFIGURABLE DIFFERENTIATED SERVICE

(75) Inventor: Gerald E. Underwood, Plano, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 847 days.

(21) Appl. No.: 11/848,925

(22) Filed: Aug. 31, 2007

(65) Prior Publication Data

US 2009/0059789 A1     Mar. 5, 2009

(51) Int. Cl.
*H04L 12/28* (2006.01)
*H04W 4/00* (2009.01)
(52) U.S. Cl. .................. 370/395.21; 370/329
(58) Field of Classification Search ............ 370/352, 370/392, 468, 395.21, 395.4, 395.43, 338, 370/329; 455/453, 452, 41.2
See application file for complete search history.

(56) References Cited

U.S. PATENT DOCUMENTS

| | | | |
|---|---|---|---|
| 7,002,985 B2* | 2/2006 | Dertz et al. | 370/458 |
| 7,096,260 B1* | 8/2006 | Zavalkovsky et al. | 709/223 |
| 7,145,919 B2* | 12/2006 | Krishnarajah et al. | 370/474 |
| 7,277,446 B1* | 10/2007 | Abi-Nassif et al. | 370/412 |
| 7,400,600 B2* | 7/2008 | Mullany et al. | 370/331 |
| 7,733,881 B2* | 6/2010 | Niska et al. | 370/400 |
| 7,756,026 B2* | 7/2010 | Weiss et al. | 370/230 |
| 8,107,373 B2* | 1/2012 | Chen et al. | 370/231 |
| 2008/0037567 A1* | 2/2008 | Cho et al. | 370/401 |
| 2008/0144502 A1* | 6/2008 | Jackowski et al. | 370/235 |

* cited by examiner

*Primary Examiner* — Hanh Nguyen

(57) ABSTRACT

An approach is provided for specifying class of service (CoS) information. A wireless device is configured to connect to a wireless access point that communicates with a data network. The wireless device generates a message including a header that specifies class of service information for establishing a communication path over the data network. The class of service information is configurable by a user of the wireless device.

26 Claims, 5 Drawing Sheets

METHOD AND SYSTEM FOR PROVIDING USER CONFIGURABLE DIFFERENTIATED SERVICE

BACKGROUND OF THE INVENTION

The phenomenal growth of the Internet has presented service providers with the continual task of responding to the millions of users' demand for reliable and fast access service. Undoubtedly the Internet has revolutionized the way personal communication as well as business communication is conducted. With its expansive reach, the Internet has allowed users to communicate freely without geographic boundaries. In fact, businesses have integrated numerous Internet services, which include e-mail, mailing lists, e-commerce (electronic commerce), and the World Wide Web, into their business processes. Given the diversity of users and applications, prioritization of traffic is needed to ensure efficient transport of information. Traditionally, users have very few parameters that are under their control with respect to such prioritization.

Based on the foregoing, there is a need for efficiently transporting data taking into account the diversity of user requirements and associated traffic types.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENTS

A system, method, and software for providing user configurable differentiated services are described. In the following description, for the purposes of explanation, numerous specific details are set forth in order to provide a thorough understanding of the present invention. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although the various exemplary embodiments are described with respect to a class of service (CoS) mechanism over a wireless network, it is contemplated that these embodiments have applicability to other marking technologies and communication systems.

Figure 1:
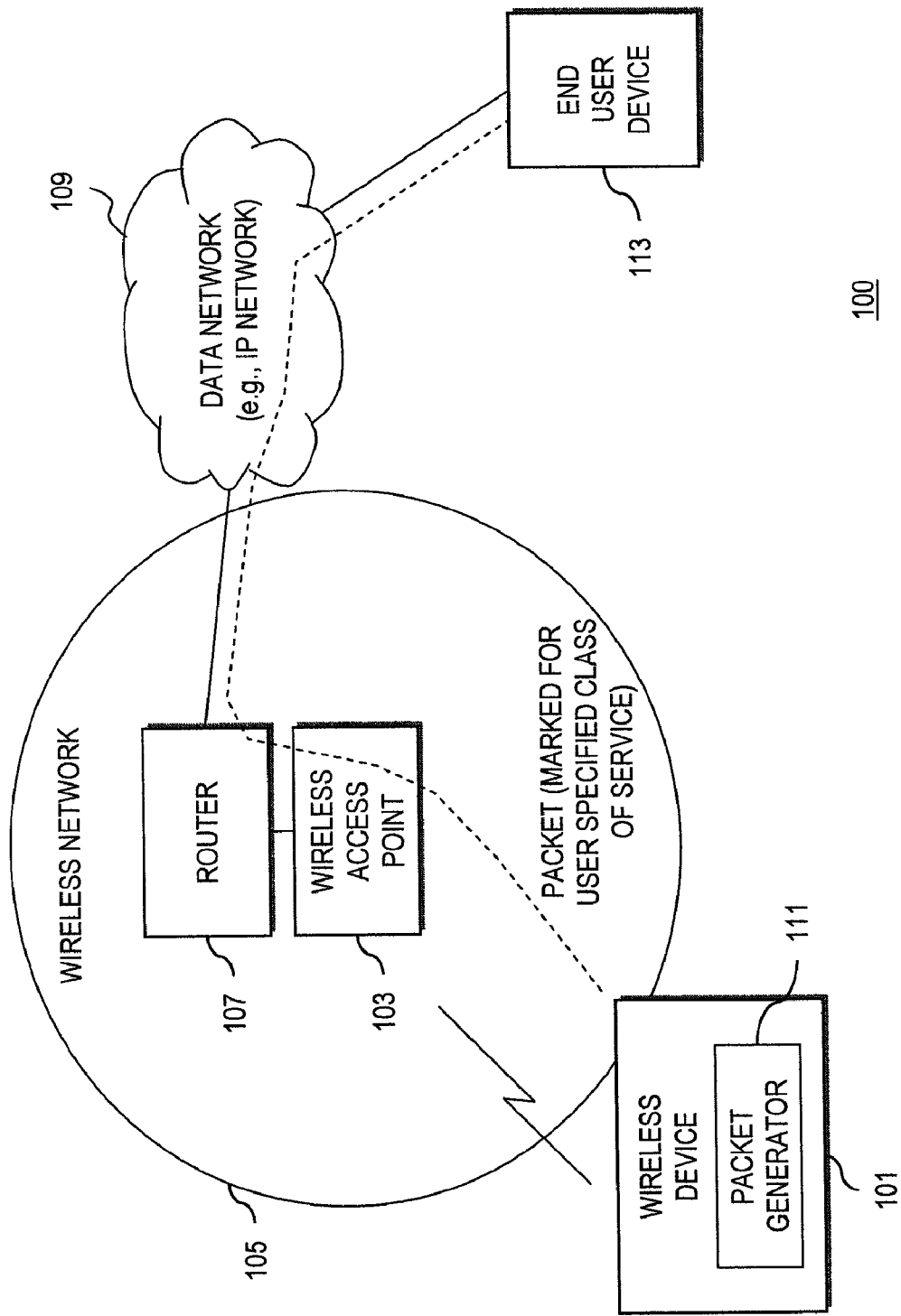
FIG. 1 is a diagram of a communication system including a wireless network capable of providing Class of Service (CoS) service, according to an exemplary embodiment.

FIG. 1 is a diagram of a communication system including a wireless network capable of providing Class of Service (CoS) service, according to an exemplary embodiment. For the purposes of illustration, a communication system 100 includes a wireless device 101 that has a capability to mark packets based on user input and/or applications in support of class of service (CoS). In an exemplary embodiment, the wireless device 101 is a hand-held mobile device, such as a cellular handset, palm computer, etc. The device 101 communicates with a wireless access point 103 within a wireless network 105. The wireless network 105 can include a router 107 for access to a data network 109, which can be an Internet Protocol (IP)-based network. The data network 109 can be an internetwork that includes the global Internet. In one embodiment, the router 107 operates at the physical layer, link layer and network layer of the Open Systems Interconnection (OSI) model to transport data across the network 105.

Figure 6:
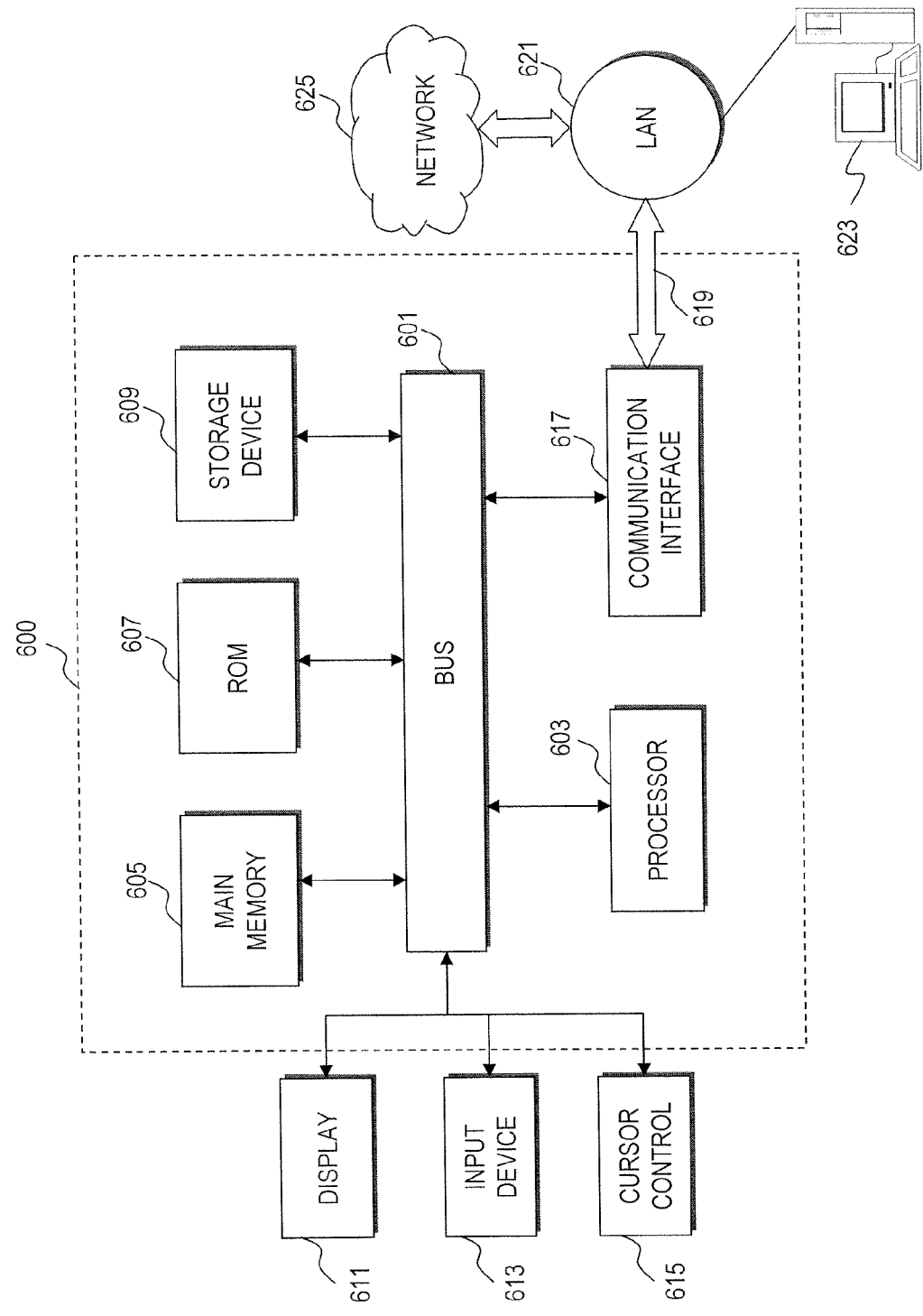
FIG. 6 is a diagram of a computer system that can be used to implement various exemplary embodiments.

Under this scenario, the router 107 behaves as an edge router to a router-based system within the data network 109. The routers (not shown) within the network 109 determine the "best" paths or routes through the network 109 by utilizing various routing protocols. Routing tables are maintained by each router for mapping input ports to output ports using information from routing protocols. Exemplary routing protocols include Border Gateway Protocol (BGP), Interior Gateway Routing Protocol (IGRP), Routing Information Protocol (RIP), and Open Shortest Path First (OSPF). In addition to intelligently forwarding data, the routers can provide various other functions, such as firewalling, encryption, etc. These router functions can be performed using a general purpose computer (as shown in FIG. 6), or be highly specialized hardware platform with greater processing capability to process high volumes of data and hardware redundancies to ensure high reliability.

The Class of Service (CoS) mechanism provides an approach for managing network traffic by grouping similar types of traffic and treating the particular type as a class associated with a particular service priority. For example, traffic types can be based on the particular application—e.g., e-mail, video file, audio file, voice, file transfer, etc. In contrast to Quality of Service (QoS), CoS mechanisms do not guarantee a level of service, but rather operate on a best effort basis. Class of service levels, in an exemplary embodiment, are user-selectable or configurable. Such CoS levels do not depend on information in the packets. Quality of service may be derived from layer 3 and/or 4 information in the received packets. Exemplary CoS technologies utilized by the communication system 100 include IEEE (Institute of Electrical and Electronics Engineers) 802.1p Layer 2 Tagging, Type of Service (ToS), and Differentiated Services (DiffServ).

The operation of the communication system 100, by way of example, is explained with respect to a DiffServ architecture. In the Diffserv domain, network resources are allocated to packet flows in accordance with service provisioning policies, which govern Diffserv Code Point (DSCP) marking and traffic conditioning upon entry to the Diffserv domain and traffic forwarding within the Diffserv domain. The marking and conditioning operations are implemented at Diffserv network boundaries. According to various embodiments, this boundary is extended to the wireless device 101.

Network traffic can be divided into the following classes: gold, silver and bronze. Gold traffic, for example, can be allocated 50 percent of the available bandwidth, while silver is provided with 30 percent and bronze with 20 percent of the available bandwidth.

As shown, the wireless device 101 includes a message (e.g., packet) generation module, or generator, 111 that can mark packets for transport to an end user device 113 over the data network 109. Although the generator 111 is denoted as a "packet" generator, it is contemplated that the generator 111 can output other types of messages and data frames.

Figure 2:
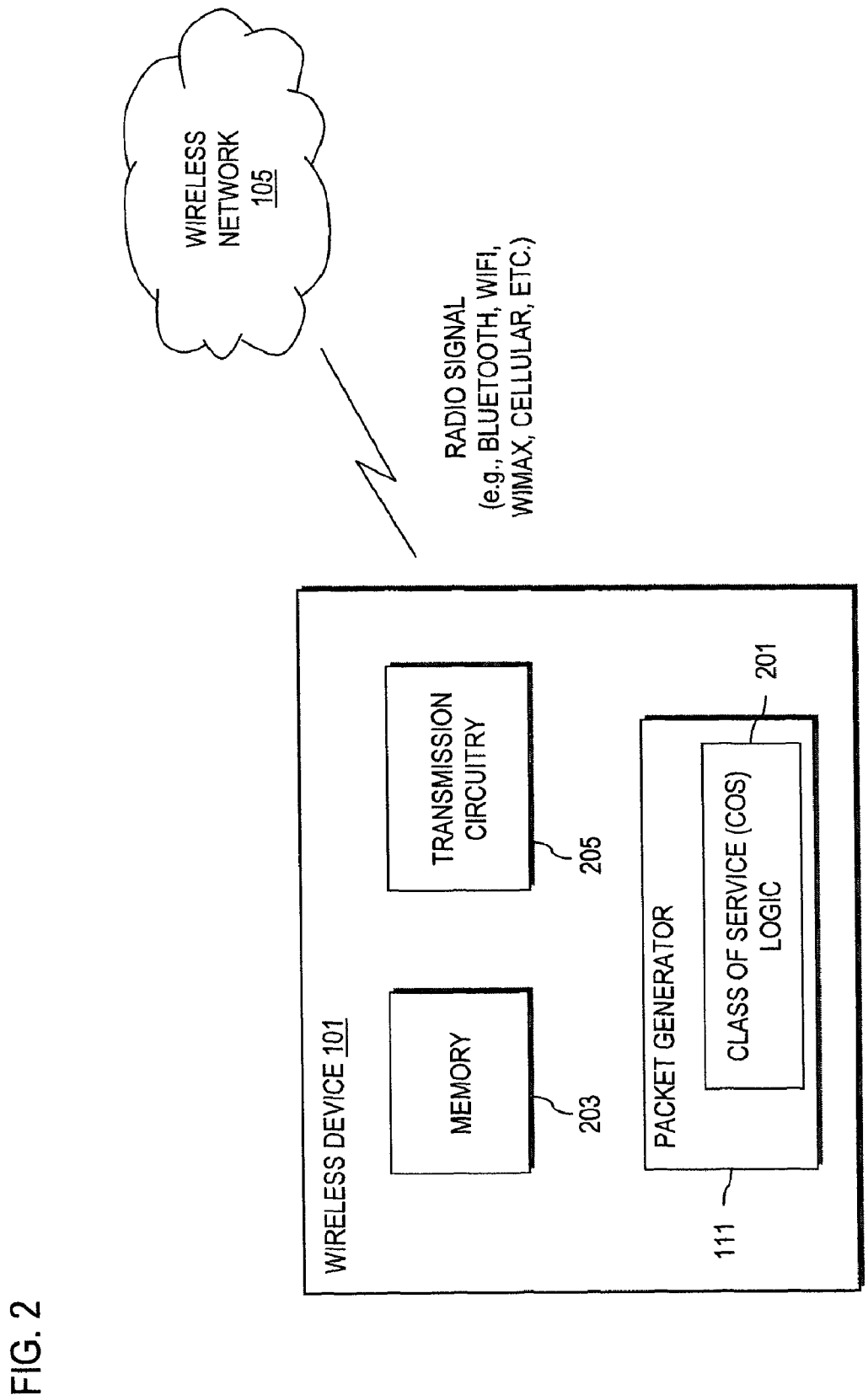
FIG. 2 is a diagram of a wireless device including a packet generation module for marking packets, according to various exemplary embodiments.

FIG. 2 is a diagram of a wireless device including a packet generation module for marking packets, according to various exemplary embodiments. Continuing with the example of FIG. 1, the wireless device 101 includes the packet generator 111, which possesses class of service logic 201 for classifying packets received from one or more applications (not shown) and marking the received packets according to the classified traffic type. For instance, the packets can be associated with voice traffic (e.g., Voice over IP) or other real-time traffic. The packet generator 111 can be designed on various interface types. According to one embodiment, the interface types include a removable memory device (e.g., compact flash), PCMCIA (Personal Computer Memory Card International Association), operating systems (e.g., Windows CE, Palm OS, etc.).

The wireless device 101 also includes memory 203 for storing or buffering the packets. Further, transmission circuitry 205 is provided for exchanging packets with the wireless network 105.

As seen, the radio signals that are transmitted to and from the wireless network 105 can be on a variety of radio transmission technologies. Such technologies, according to certain embodiments, include short-range radio frequencies—e.g., BLUFTOOTH and WiFi (Wireless Fidelity). Alternatively, the radio frequencies can support cellular traffic.

Figure 3:
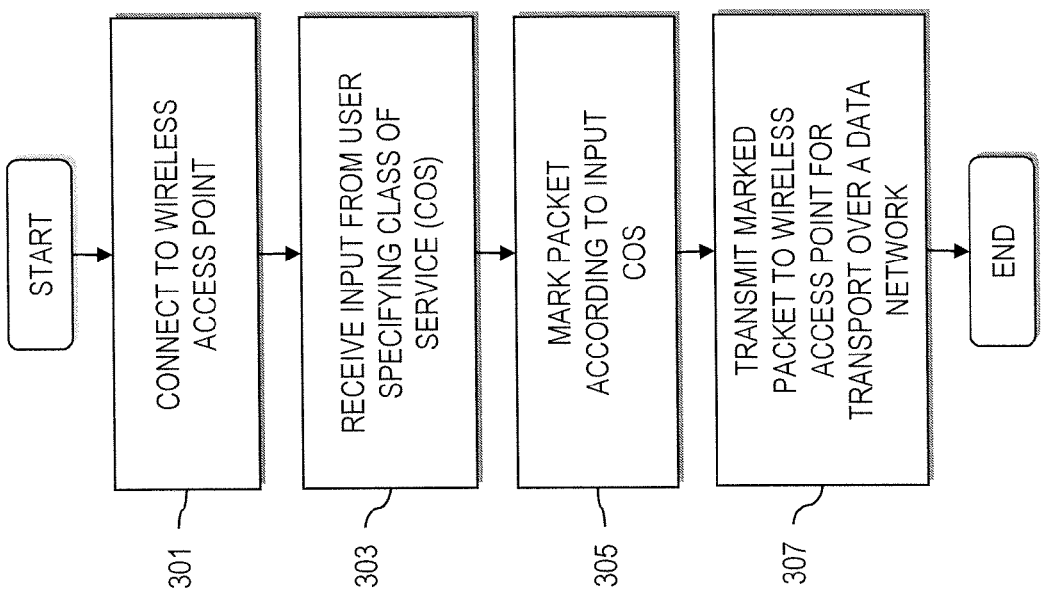
FIG. 3 is a flowchart of a process for generating a marked packet specifying CoS via a wireless device, according to an exemplary embodiment.

FIG. 3 is a flowchart of a process for generating a marked packet specifying CoS via a wireless device, according to an exemplary embodiment. In step 301, the wireless device 101 connects to the wireless access point 103. A user of the device 101 then provides input for specifying a class of service, as in step 303. Alternatively, the CoS information can be specified automatically, depending on the particular applications, e.g., e-mail, voice, streaming audio, streaming video, etc. In step 305, the packet(s) is marked according to classification of the packet. Next, the marked packet is transmitted to the wireless access point 103 for transport over the data network (as in step 307).

With the above process, a wireless service provider can readily obtain a revenue source associated with permitting users to configure their own class of service levels, conveniently through their wireless devices.

Figure 4:
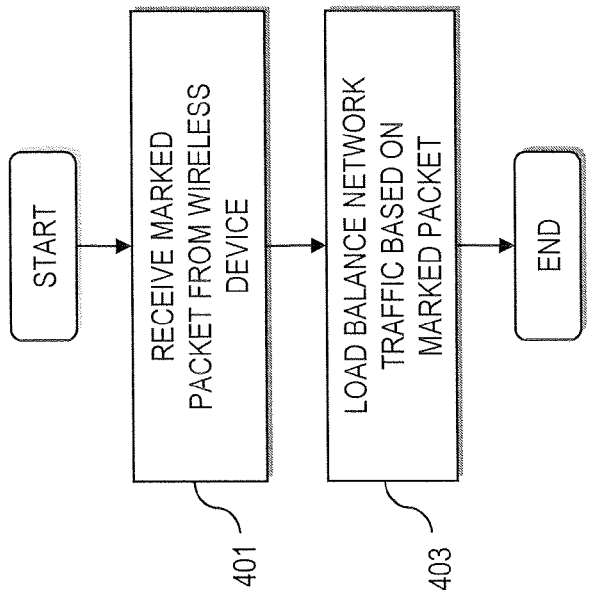
FIG. 4 is a flowchart of a process for performing network load balancing based on marked packets, according to an exemplary embodiment.

FIG. 4 is a flowchart of a process for performing network load balancing based on marked packets, according to an exemplary embodiment. In step 401, a packet that is marked by the wireless device 101 is received. This marked packet is then utilized to load balance the network traffic, as in step 403, whereby a particular type of traffic can be directed over one communication path and another traffic type can be sent over a different communication path over the data network 109.

The markings performed by the wireless device 101 involve setting the header of the packets, as next explained with respect to the DiffServ architecture.

Figure 5:
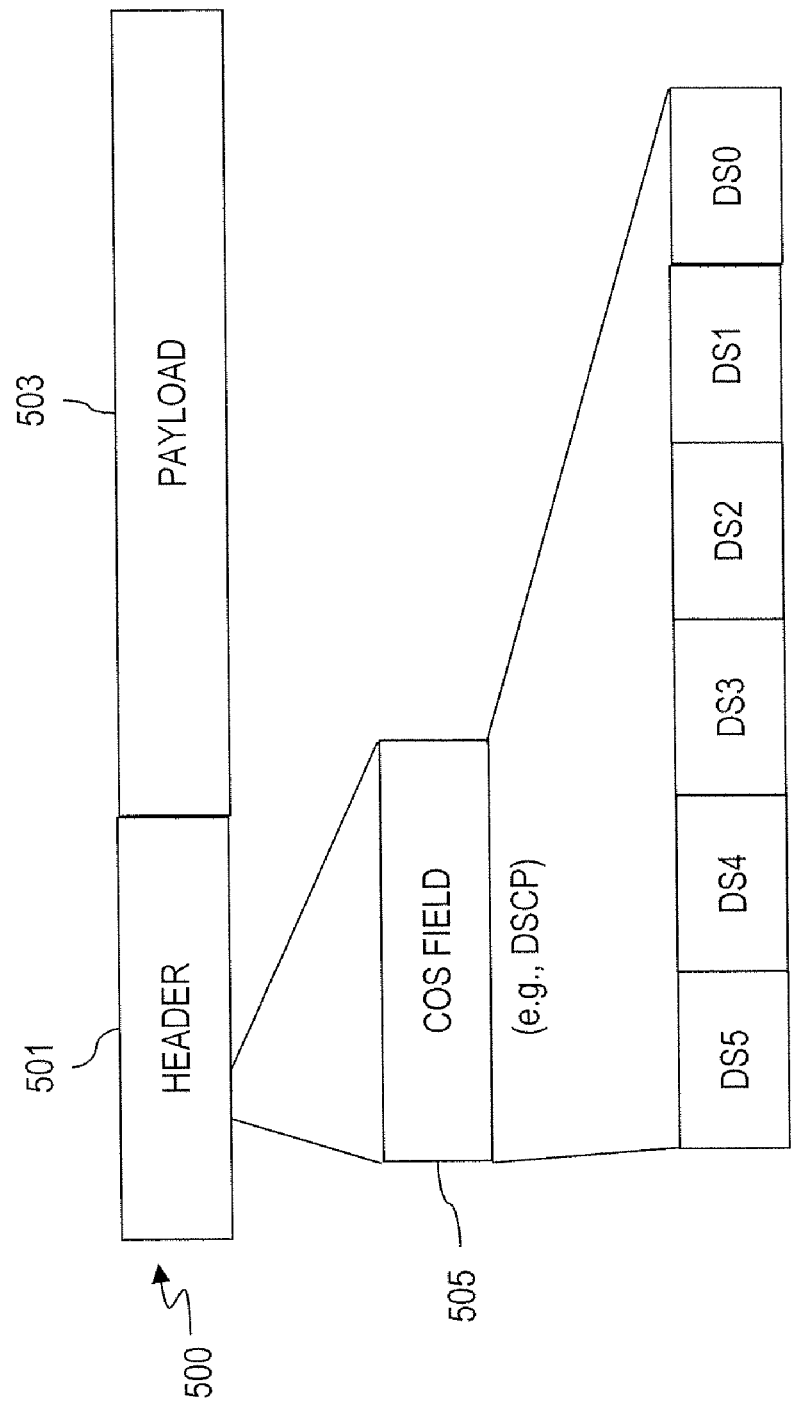
FIG. 5 is a diagram of format of a packet including a CoS field, according to an exemplary embodiment.

FIG. 5 is a diagram of format of a packet including a CoS field, according to an exemplary embodiment. A packet 500 includes a header 501 and a payload 503. In this example, the header 501 includes a CoS field 505; in the context of DiffServ this field is denoted a "DS field." In an exemplary embodiment, the CoS field 505 includes six bits, DS5-DS0, which can be set to correspond to different CoS levels. Each DSCP specifies a particular per-hop behavior that is applied to the received packet.

As an IP QoS architecture, DiffServ conveys aggregate traffic classification within the DS field 505 (e.g., the IPv4 Type of Service (TOS) byte or TPv6 traffic class byte) of each IP-layer packet header. The first six bits of the DS field encode a Diffserv Code Point (DSCP) that requests a specific class of service or Per Hop Behavior (PHB) for the packet at each node of the network 109 along the communication path. That is, the six bits of the DS field 505 are used as the DSCP to select the Per Hop Behavior (PHB) at each interface. Exemplary PHBs include: (1) default PHB (as defined in Internet Engineering Task Force (IETF) Request for Comment (RFC) 2474); class-selector PHB (as defined in RFC 2474); Assured Forwarding (AFny) PHB (as defined in RFC 2597); and expedited forwarding (EF) PHB (as defined in RFC 2598). The RFCs 2474, 2597 and 2598 are incorporated herein by reference in their entireties. Effectively, the PHB refers to the packet scheduling, queueing, policing, or shaping behavior of a node on any given packet corresponding to a behavior aggregate (BA), as configured by a service level agreement (SLA) or a policy map By way of example, voice traffic can be Expedited Forwarding can be implemented using priority queueing (PQ), along with rate-limiting on the class (or BA). When implemented in a DiffServ network, EF PHB provides a premium service, and thus, is well suited for applications such as VoIP that require low bandwidth, guaranteed bandwidth, low delay, and low jitter.

The above described processes relating to marking packets may be implemented via software, hardware (e.g., general processor, DSP chip, an application specific integrated circuit (ASIC), field programmable gate arrays (FPGAs), etc.), firmware, or a combination thereof. Such exemplary hardware for performing the described functions is detailed below.

FIG. 6 illustrates a computer system 600 upon which an embodiment according to an exemplary embodiment can be implemented. For example, the processes described herein can be implemented using the computer system 600. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to one embodiment contemplated herein, the processes described are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement certain embodiments. Thus, the exemplary embodiments are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an exemplary embodiment through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out various embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:
    connecting, using a wireless device, to a wireless access point configured to allow a user of the wireless device to communicate with a data network; and
    generating, via the wireless device, a message including a header that specifies class of service information for establishing a communication path over the data network,
    wherein the class of service information is configurable by the user of the wireless device.

2. A method as recited in claim 1, wherein the wireless device includes a handheld mobile device.

3. A method as recited in claim 1, wherein the wireless access point is configured to establish the connection using a short-range radio frequency.

4. A method as recited in claim 1, wherein the message has an Internet Protocol (IP) packet format.

5. A method as recited in claim 4, wherein the class of service information is specified in a Differentiated Services Control Point (DSCP) field of the IP packet format.

6. A method as recited in claim 1, wherein the class of service information is utilized for load balancing.

7. A method as recited in claim 1, wherein the wireless access point includes a cellular base station.

8. A method as recited in claim 1, wherein the class of service information is configured in real-time by the wireless device.

9. A non-transitory computer-readable storage medium bearing instructions that are arranged, upon execution, to cause one or more processors to perform the method of claim 1.

10. A method as recited in claim 1, wherein the class of service information is configured by marking communication packets based on user input.

11. An apparatus comprising:
a wireless communication interface configured to connect to a wireless access point, wherein the wireless access point is configured to allow a user of a wireless device to communicate with a data network; and
a message generator configured to generate, via the wireless device, a message including a header that specifies class of service information for establishing a communication path over the data network,
wherein the class of service information is configurable by the user of the wireless device.

12. An apparatus as recited in claim 11, wherein the wireless device includes a handheld mobile device.

13. An apparatus as recited in claim 11, wherein the wireless access point is configured to establish the connection using a short-range radio frequency.

14. An apparatus as recited in claim 11, wherein the message has an Internet Protocol (IP) packet format.

15. An apparatus as recited in claim 14, wherein the class of service information is specified in a Differentiated Services Control Point (DSCP) field of the IP packet format.

16. An apparatus as recited in claim 11, wherein the class of service information is utilized for load balancing.

17. An apparatus as recited in claim 11, wherein the wireless access point includes a cellular base station.

18. An apparatus as recited in claim 11, wherein the class of service information is configured in real-time by the wireless device.

19. A system comprising:
a wireless access point configured to connect to a wireless device and to allow a user of the wireless device to communicate with a data network,
wherein the wireless device is configured to generate a message including a header that specifies class of service information for establishing a communication path over the data network, and the class of service information is configurable by the user of the wireless device.

20. A system as recited in claim 19, wherein the wireless device includes a handheld mobile device.

21. A system as recited in claim 19, wherein the wireless access point is configured to establish the connection using a short-range radio frequency.

22. A system as recited in claim 19, wherein the message has an Internet Protocol (IP) packet format.

23. A system as recited in claim 22, wherein the class of service information is specified in a Differentiated Services Control Point (DSCP) field of the IP packet format.

24. A system as recited in claim 19, wherein the class of service information is utilized for load balancing.

25. A system as recited in claim 19, wherein the wireless access point includes a cellular base station.

26. A system as recited in claim 19, wherein the class of service information is configured in real-time by the wireless device.

* * * * *